United States Patent
Welch et al.

[11] 3,708,479
[45] Jan. 2, 1973

[54] ACYLOXYMETHYL ESTERS OF ALPHA-UREIDOCYCLO-HEXADIENYLALKYLENE-CEPHALOSPORINS

[75] Inventors: Arnold D. Welch, Princeton, N.J. 08540; Joseph Edward Dolfini, North Brunswick, N.J., Frederick F. Giarrusso, Belle Mead, N.J.

[73] Assignee: E. R. Squibb & Sons, Inc., New York, N.Y.

[22] Filed: Oct. 26, 1970

[21] Appl. No.: 84,170

[52] U.S. Cl. ..................... 260/243 C, 424/246
[51] Int. Cl. ............................... C07d 99/24
[58] Field of Search ....................... 260/243 C

[56] References Cited

UNITED STATES PATENTS 3,485,819  12/1969  Weisenborn et al. .............. 260/239.1
3,352,851  11/1967  Fosker ............................. 260/239.1
3,250,679  5/1966  Jansen et al. ...................... 260/239.1

*Primary Examiner*—Nicholas S. Rizzo
*Attorney*—Lawrence S. Levinson, Merle J. Smith, Donald J. Perrella and Burton Rodney

[57] ABSTRACT

New acyloxymethyl esters of α-ureidocyclohexadienylalkylene-cephalosporins of the general formula

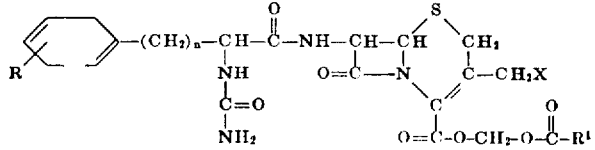

are effective as antibacterial agents and show prolonged action as well as other improved results.

7 Claims, No Drawings

ACYLOXYMETHYL ESTERS OF ALPHA-UREIDOCYCLO-HEXADIENYLALKYLENE-CEPHALOSPORINS

SUMMARY OF THE INVENTION

This invention relates to new acyloxymethyl esters of α-ureidocyclohexadienylalkylene cephalosporanic acid compounds of the formula (I)

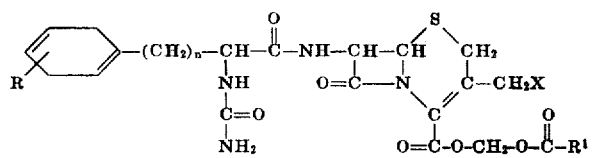

which are antibacterial agents effective against a variety of bacterial pathogens, both gram-positive and gram-negative bacteria, and which give rise to higher blood levels of the antibiotic.

R in formula I represents hydrogen, lower alkyl or lower alkoxy. $R^1$ is lower alkyl or monocyclic carbocyclic aryl- or aralkyl (the aryl portions of the last two radicals being monocyclic carbocyclic aryl and the alkyl being lower alkyl of up to seven carbons).

X is hydrogen, lower alkoxy, lower alkanoyloxy, aroyloxy or aralkanoyloxy, (the aryl and aralkyl portions of the last two groups being the same as defined for $R^1$, e.g., benzoyloxy, phenyl-lower alkanoyloxy like phenylacetoxy), the radical of a nitrogen base or a quaternary ammonium radical. $n$ is 0, 1, 2, 3 or 4.

Preferred members in each group include R as hydrogen; $n$ as 0 or 1, especially 0; $R^1$ as t-butyl or phenyl, especially t-butyl; X as hydrogen or lower alkanoyloxy, especially acetoxy.

DETAILED DESCRIPTION OF THE INVENTION

The symbol R in formula I represents a lower alkyl group, e.g., a branched or straight chain saturated aliphatic hydrocarbon group having up to seven carbons in the chain, including methyl, ethyl, propyl, isopropyl, butyl, isobutyl, t-butyl, amyl and the like and also lower alkoxy groups wherein similar alkyl groups are attached to an oxygen.

$R^1$ completes the ester group and represents a lower alkyl group of the type defined previously, preferably t-butyl. $R^1$ may also represent monocyclic carbocyclic aryl or aralkyl groups like phenyl, benzyl, phenethyl, phenylisopropyl or the like. Thus acyloxymethyl ester like acetoxymethyl, propionyloxymethyl, isopropionyloxymethyl, butyryloxymethyl, pivaloyloxymethyl, valeroyloxymethyl, benzoyloxymethyl, phenacetyloxymethyl esters and the like are included.

The symbol $n$ represents 0, 1, 2, 3 or 4, preferably the first two. X is hydrogen, lower alkoxy, e.g., methoxy, ethoxy, propoxy, isopropoxy or the like, lower alkanoyloxy, e.g., acetoxy, propionyloxy or the like or the radical of an amine, e.g., N-pyridinium, or the like.

The new compounds of this invention are preferably produced from either a 7-aminocephalosporanic acid compound of formula II or salt thereof (II)

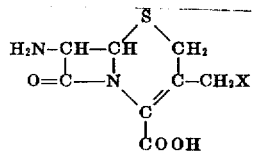

or from a 7-[2-ureido-2-(1,4-cyclohexadienylalkyl)acetamido]-cephalosporanic acid of formula III or salt thereof.

(III)

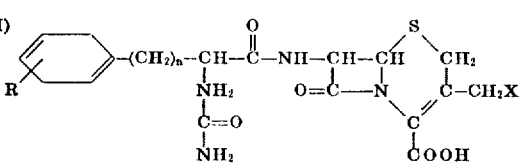

R, X and $n$ have the meanings already defined.

The salts are those formed with the carboxyl group and are known e.g., alkali metal salts, alkaline earth metal salts, salts with organic amines etc.

The acyloxymethyl ester of either a compound of formula II or formula III is produced, e.g., by a method adapted from that of Daehne et al., Jour. Med. Chem. 13, 607 (1970), from either type of compound by reaction with a halomethyl ester (IV)

$$halCH_2OCOR^1$$

wherein $R^1$ has the meaning already defined and hal is halogen, preferably chlorine or bromine.

The acid or salt of either formula II or formula III is treated with the halomethyl ester in a molar ratio of about 1:1 to 1:2 in an inert organic solvent like dimethylformamide, acetone, dioxane, benzene or the like at about ambient temperature or below.

The products resulting from the reaction of a compound of formula III with a halomethyl ester of formula IV may be isolated as slightly soluble salts with inorganic or organic acids such as hydrochloric acid or p-toluenesulfonic acid.

In the case of a compound of formula II reaction with an acyl halomethyl ester provides a corresponding acyloxymethyl ester. The resulting ester is then reacted with a 1,4-cyclohexadienyl-α-aminoalkanoic acid, the carbamyl derivative or an N-protected derivative thereof as described in more detail below.

The starting compounds of formula III are produced as described in the copending application of Raymond Curry Erickson Ser. No. 877,488, filed Nov. 17, 1969, by first forming a compound of the formula (V)

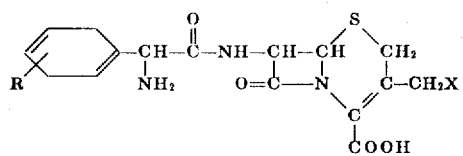

and then treating the compound of formula V with a cyanate, e.g., an alkali metal cyanate such as potassium cyanate or with carbamyl phosphate.

The substances of formula V are produced as described in U.S. Pat. No. 3,485,819, issued Dec. 23, 1960, from a 7-aminocephalosporanic acid compound of the formula (VIII)

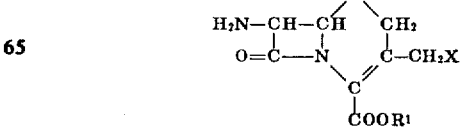

wherein $R^1$ and X have the meanings already described. The latter are obtained as described in U.S. Pat. No. 3,391,141.

The carbamylation is effected by dissolving or suspending the α-amino acid compound in aqueous medium and the cyanate or carbamyl phosphate is slowly added. Heat, e.g., up to about 80° C., may be used to accelerate the reaction. The pH of the reaction mixture is preferably kept on the acid side, e.g., within the range of about 5 to 6.9. The product may usually be precipitated by acidification and chilling.

As indicated, the carbamylation reaction may be carried out as the last step of the synthesis, as preferred, or at any earlier stage of the synthesis.

It will be appreciated that certain of the compounds of this invention exist in various states of solvation as well as in different optically active forms. The various forms as well as their mixtures are within the scope of this invention.

Ordinarily the new compounds of this invention derived from D-α-amino acids or derivatives thereof are more active than the corresponding compound derived from the L-form or DL-form. The configuration of the α-carbon of the α-amino acid used in the synthesis is retained in the product.

The compounds of this invention have a broad spectrum of antibacterial activity against both gram positive and gram negative organisms such as *Staphylococcus aureus*, *Salmonella schottmuelleri*, *Proteus vulgaris*, *Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to chephalosporin C, cephalothin and other cephalosporins. For example, a compound of formula I may be used in various animal species in an amount of about 1 to 200 mg./kg. daily, orally or parenterally, in single or two to four divided doses to treat infections of bacterial origin. By way of illustration the $PD_{50}$ subcutaneously in mice in a single administration is of the order of 5 mg./kg. against *Streptococcus*. The oral form gives a prompt high blood level which is maintained for relatively long periods.

Up to about 600 mg. of a compound of formula 1 or a salt thereof may be incorporated in an oral dosage form such as tablets, capsules or elixirs or in an injectable form in a sterile aqueous vehicle prepared according to conventional pharmaceutical practice.

In cleaning or disinfecting compositions, e.g., in barns or dairy equipment, a concentration of about 0.01 to 1 percent by weight of such compounds admixed with, suspended or dissolved in conventional inert dry or aqueous carriers for application by washing or spraying may be used.

They are also useful as nutritional supplements in animal feeds.

The following examples are illustrative. All temperatures are on the centigrade scale.

EXAMPLE 1 a. D-2-Amino-2-(1,4-cyclohexadien-1-yl)acetic acid

A solution of 11.0 g. (72.7 mmol.) of D-phenylglycine in 900 ml. distilled ammonia (which has been treated with 45 mg. lithium after distillation to destroy traces of moisture) is slowly diluted with 370 ml. dry t-butyl alcohol.

Over a period of 2 hours, 1.65 g. lithium (3.27 eq.) is added in small portions until a permanent blue color is obtained. The blue reaction mixture is then treated with 38 g. of triethylamine hydrochloride. The ammonia is allowed to evaporate at room temperature overnight and the residual solvent is evaporated at reduced pressure. The white residue is taken up in a small amount of methanol-water and added to 4 t. of cold 1:1 chloroform acetone to precipitate the crude product. After 20 minutes stirring the suspension is filtered and the white filter cake dried in vacuo; the filter cake is then pulverized and submitted once more to the precipitation process from 1:1 chloroform-acetone. D-2-amino-2-(1,4-cyclo-hexadien-1-yl)acetic acid is obtained as a white crystalline product, m.p. 297° (dec.)./ b. Methyl acetoacetic ester enamine of N-2-amino-2-(1,4-cyclohexadien-1-yl)acetic acid sodium salt 306 mg. D-2-amino-2-(1,4-cyclohexadien-1-yl)acetic acid (2.00 mmols.) are dissolved by warming in a solution of 108 mg. of $NaOCH_3$ (2.00 mmols.) in 4.3 ml. reagent grade MeOH. 255 mg. (0.24 ml. – 2.20 mmols.) methyl acetoacetate are added and the mixture refluxed for 45 minutes. The MeOH is almost totally stripped off in vacuo. 5 ml. benzene are added and distilled off to a small residual volume. The addition and distillation of benzene is repeated to insure complete removal of the MeOH and water. The product crystallizes our overnight from a small residual volume of benzene. It is filtered off, washed with benzene, and dried in vacuo.

7-[D-2-Amino-2-(1,4-cyclohexadien-1-yl)acetamido]cephalosporanic acid 452 mg. of 7-aminocephalosporanic acid (7–ACA) are stirred well in 2.5 ml. of water while 0.23 ml. triethylamine are gradually added with the pH kept under 8.0. Final pH is 7.4; 0.85 ml. acetone are added and the solution is kept at $-10°$ C.

469 mg. methyl acetoacetate enamine of D-2-amino-2-(1,4-cyclohexadien-1-yl)acetic acid sodium salt, are stirred in 4.25 ml. acetone at $-20°$ C. A microdrop of N-methylmorpholine is added followed by the slow addition of 198 mg. of ice cold ethyl chloroformate. 0.43 ml. of water is added at this point. The reaction mixture is stirred for 10 minutes at $-20°$ C.

The solution of mixed anhydride is then added to the 7-ACA solution. The solution is stirred for 30 minutes at $-10°$ C., then raised to room temperature, acidified to pH 2.0 with diluted HCl and, with good stirring the pH is kept at that level for 10 minutes.

The solution is then extracted with 5 ml. xylene. The aqueous layer is layered with 5 ml methyl isobutyl ketone and the pH adjusted to 5.0 with 1 N NaOH and chilled overnight. The resulting crystals of 7-[D-2-amino-2-(1,4-cyclohexadien-1-yl)-acetamido]cephalosporanic acid are filtered off, washed with water and air dried.

d. 7-[D-2-ureido-2-(1,4-cyclohexadien-1-yl)acetamido]cephalosporanic acid and potassium salt To a suspension of 75 mg. of the product of part c in 7.5 ml. of water there are added 150 mg. of potassium cyanate with stirring. The reaction mixture, which soon clears, is incubated at 22°–24° and the pH maintained between 5.0 and 6.9 by frequent dropwise additions of 1.0 N hydrochloric acid with stirring. After 5 hours, the solution is adjusted to 10.0 ml., acidified to pH 1.8 with 1.0 N. hydrochloric acid, and extracted successively with four 75 ml. portions of ethyl acetate. The ethyl acetate is washed four times with 10 ml. portions of water adjusted to pH 2.0 with hydrochloric acid, filtered and evaporated at 10°–20°C. in vacuo to give 7-[D-2-ureido-2-(1,4-cyclohexadien-1-yl)acetamido]cephalosporanic acid as an amorphous white powder.

The potassium salt is obtained by suspending the powder in 80 ml. of water and treated with one equivalent of 0.1 N aqueous potassium hydroxide solution which is added with vigorous stirring. The solution is evaporated to dryness in vacuo at 25°–30° to obtain the potassium salt.

e. Pivaloyloxymethyl ester of 7-[D-2-ureido-2-(1,4-cyclohexadien-1-yl)acetamido]cephalosporanic acid 3.0 gm. (20 mmol.) of chloromethylpivalate are combined with 3.90 gm. (10 mmol.) of the potassium salt of part d, 0.4 ml. of a five percent aqueous sodium iodide and 170 ml. of acetone. The whole is stirred for 16 hours under an argon atmosphere followed by one hour of heating at reflux temperature. The mixture is cooled, filtered and concentrated at reduced pressure. The residue is partitioned between 250 ml. ethyl acetate and 100 ml. of dilute aqueous sodium bicarbonate solution. The organic layer is washed with water until the washes are at pH7. After drying over sodium sulfate, the organic solution is concentrated at reduced pressure. The oily residue is scrubbed with ether to produce the solid pivaloyloxymethyl ester of 7-[D-2-ureido-2-(1,4-cyclohexadien-1-yl)acetamido]cephalosporanic acid.

EXAMPLE 2

Pivaloyloxymethyl ester of 7-[D-2-ureido-2-(1,4-cyclohexadien-1-yl)acetamido]-3-desacetoxycephalosporanic acid 7-[D-2-(1,4-cyclohexadien-1-yl)acetamido]-3-desacetoxycephalosporanic acid is obtained by the procedure of Example 1 by substituting 7-amino-3-desacetoxycephalosporanic acid (7-ADCA, which is produced as described in U.S. Pat. No. 3,391,141)for the 7-ACA in part c. Then utilizing this product in part d and continuing as in part e, the pivaloyloxymethyl ester of 7-[D-2-ureido-2-(1,4-cyclohexadien-1-yl)acetamido]-3-desacetoxycephalosporanic acid is obtained.

EXAMPLE 3

Pivaloyloxymethyl ester of 7-[D-2-ureido-2-(1,4-cyclohexadien-1-yl)acetamido]cephalosporanic acid 300 mg. (2 mmol.) of chloromethylpivalate are added to a mixture of 390 mg. (1 mmol.) of the product of Example 1 d (potassium salt) and 15 ml. of dimethylformamide. The whole is stirred under an argon atmosphere for 24 hours. 150 ml. of ethyl acetate are added and the whole is filtered. The filtrate is washed with three portions of 5 percent aqueous sodium bicarbonate solution and with water until the water is at pH 7. The product is then dried over sodium sulfate and concentrated at reduced pressure. The residual product, the pivaloyloxymethyl ester of 7-[2-ureido-2-(1,4-cyclohexadien-1-yl)acetamido]cephalosporanic acid, is scrubbed with hexane and dried.

EXAMPLE 4

By substituting 20 mmol. of chloromethylbenzoate for the chloromethylpivalate in the procedure of Example 1 e, the benzoyloxymethyl ester of 7-[D-2-ureido-2-(1,4-cyclohexadien-1-yl)acetamido]cephalosporanic acid is obtained.

EXAMPLE 5 a. D-2-amino-3-(1,4-cyclohexadien-1-yl)propionic acid 12.0 g. of D-phenylalanine are substituted for the D-phenylglycine in the procedure of Example 1 to obtain D-2-amino-3-(1,4-cyclohexadien-1-yl)propionic acid as a white powder.

b. Methyl acetoacetate ester enamine of D-2-amino-3-(1,4-cyclohexadien-1-yl)propionic acid sodium salt This product is obtained by substituting 330 mg. of the product of part a above in the procedure of Example 1 b.

c. 7-[D-2-amino-3-(1,4-cyclohexadien-1-yl)propionamido]-cephalosporanic acid 493 mg. of methyl acetoacetate enamine of D-2-amino-3-(1,4-cyclohexadien-1-yl)propionic acid sodium salt (1.715 mmol.) are substituted for the methyl acetoacetate enamine of D-2-amino-2-(1,4-cyclohexadien-1-yl)acetic acid sodium salt in the procedure of Example 1 c.

The mixed anhydride is added to the 7–ACA, stirred for 30 minutes at −10° C., brought to room temperature, acidified to pH 2.0 as in Example 1 c. The solution is then extracted with 5ml. of xylene. The aqueous layer is layered with 5 ml. of methyl isobutyl ketone and the pH is adjusted to 5.0 with 1 N NaOH. The aqueous layer is then lyophilized to give 7-[D-2-amino-3-(1,4-cyclohexadien-1-yl)propionamido]cephalosporanic acid.

d. 7-[D-2-ureido-3-(1,4-cyclohexadien-1-yl)propionamido]-cephalosporanic acid and salt By utilizing the product of part c in the procedure of Example 1 d, 7-[D-2-ureido-3-(1,4-cyclohexadien-1-yl)-propionamido]cephalosporanic acid and the potassium salt are obtained.

e. Pivaloyloxymethyl ester of 7-[D-2-ureido-3-(1,4-cyclohexadien-1-yl)propionamido]cephalosporanic acid By utilizing the potassium salt of part d above in the procedure of Example 1 e, the pivaloyloxymethyl ester of 7-[D-2-ureido-3-(1,4-cyclohexadien-1-yl)propionamido]cephalosporanic acid is obtained.

EXAMPLE 6

Acetoxymethyl ester of 7-[D-2-ureido-2-(4-methoxy-1,4-cyclohexadien-1-yl)propionamido]cephalosporanic acid By substituting 14.2 g. (72.7 mmol.) of D-0-methyltyrosine for the phenylglycine in the procedure of Example 1 a, D-2-amino-3-(4-methoxy-1,4-cyclohexadien-1-yl)propionic acid is obtained as a white crystalline product, m.p. 227° C.

Then by using this compound in the procedure of Example 1, parts b, c and d, and by substituting 20 mmol. of chloromethyl-acetate for the chloromethyl pivalate

EXAMPLE 7

Pivaloyloxymethyl ester of 7-[D-2-ureido-3-(1,4-cyclohexadien-1-yl)-propionamido]-3-desacetoxycephalosporanic acid By utilizing the procedure of Example 5, but substituting 356 mg. of 3-desacetoxy-7-aminocephalosporanic acid for the 7–ACA, the above produce is obtained.

EXAMPLE 8

Pivaloyloxymethyl ester of 7-[DL-2-ureido-2-(4-methyl-1,4-cyclohexadien-1-yl)acetamido]cephalosporanic acid By substituting DL-4-methylphenylglycine for the phenyl-glycine in part a and otherwise following the procedure of Example 1, the above product is obtained.

EXAMPLE 9

Pivaloyloxymethyl ester of 7-[DL-2-ureido-2-(4-methyl-1,4-cyclohexadien-1-yl)-3-desacetoxycephalosporanic acid By substituting DL-4-methylphenylglycine for the phenyl-glycine in part a and substituting 7–ADCA for 7–ACA in part c, then otherwise following the procedure of Example 1, the above named product is obtained.

EXAMPLE 10 a. By substituting 10 mmol. of 7-ACA and adding 20 mmol. of triethylamine but otherwise following the procedure of Example 1 e the pivaloyloxymethyl ester of 7–ACA is obtained.

b. 647 mg. of 7-aminocephalosporanic acid pivaloyloxymethyl ester are stirred well in 3.0 ml. of acetone and the solution is kept at −10° C.

469 mg. of the methyl acetoacetate enamine of D-2-amino-2-(1,4-cyclohexadien-1-yl)acetic acid sodium salt, are stirred in 4.25 ml. acetone at 20° C. A microdrop of N-methyl-morpholine is added followed by the slow addition of 198 mg. of ice cold ethyl chloroformate. 0.43 ml. of water is added at this point. The reaction mixture is stirred for 10 minutes at −20° C.

The solution of mixed anhydride is then added to the 7–ACA ester solution. The solution is stirred for 30 minutes at −10° C., then raised to room temperature, acidified to pH 2.0 with diluted HCl and, with good stirring the pH is kept at that level for 10 minutes.

The solution is then diluted with 5 ml. water and extracted with 5 ml. xylene. The aqueous layer is layered with 10 ml. ether and the pH adjusted to 7.0 with 1 N NaOH. The ether layer is dried over sodium sulfate and then evaporated at reduced pressure to deposit the product, the pivaloyloxy-methyl ester of 7-[D-2-amino-2-(1,4-cyclohexadien-1-yl)-acetamido]cephalosporanic acid.

c. To a suspension of 85 mg. of the product of part b in 10 ml. of acetone:water (1:1) there are added 150 mg. of potassium cyanate with stirring. The reaction mixture is incubated at 22°–24° and the pH maintained between 5.0 and 6.9 by frequent dropwise additions of 1.0 hydrochloric acid with stirring. After 5 hours, the solution is adjusted to 10.0 ml., acidified to pH 1.8 with 1.0 N hydrochloric acid, and extracted successively with four 75 ml. portions of ethyl acetate. The ethyl acetate is washed four times with 10 ml. portions of water adjusted to pH 2.0 with hydrochloric acid, filtered and evaporated at 10°–20° C. in vacuo to give 7-[D-2-ureido-2-(1,4-cyclohexadien-1-yl)acetamido]cephalosporanic acid pivaloyloxymethyl ester as an amorphous white powder.

EXAMPLE 11

By substituting 10 mmol. of 7–ADCA for the 7–ACA in the procedure of Example 10 a, the same product is obtained as in Example 2.

EXAMPLE 12 a. A suspension of 1.0 g. of DL-2-amino-3-(1,4-cyclohexadien-1-yl)-acetic acid in 10.0 ml. of water is treated with 0.59 g. of potassium cyanate and heated at 80° C. with stirring until a clear solution develops. The solution is cooled, incubated at 24° C. for 18 hours and then acidified with 2.0 N hydrochloric acid to precipitate DL-2-ureido-3-(1,4-cyclohexadien-1-yl)acetic acid which is washed with cold water and dried over calcium chloride in vacuo.

b. 647 mg. of 7-aminocephalosporanic acid pivaloyloxymethyl ester are stirred well in 3.0 ml. of acetone and the solution is kept at −10° C.

349 mg. of DL-2-ureido-2-(1,4-cyclohexadien-1-yl)acetic acid are stirred in 4.25 ml. acetone at −20° C. A microdrop of N-methylmorpholine is added followed by the slow addition of 198 mg. of ice cold ethyl chloroformate. 0.43 ml. of water is added at this point. The reaction mixture is stirred for 10 minutes at −20° C.

The solution of mixed anhydride is then added to the 7–ACA ester solution. The solution is stirred for 30 minutes at −10° C., then raised to room temperature, acidified to pH 2.0 with diluted HCl and, with good stirring the pH is kept at that level for 10 minutes. The solution is diluted with 10 ml. water and extracted with 20 ml. ethyl acetate. The organic layer is washed with cold 1 percent aqueous hydrochloric acid and cold 1 percent sodium bicarbonate. After drying over sodium sulfate, evaporation at reduced pressure the product, the pivaloyloxy-methyl ester of 7-[DL-2-ureido-2-(1,4-cyclohexadien-1-yl)-acetamido]cephalosporanic acid is deposited.

EXAMPLE 13

Benzoyloxymethyl ester of 7-[D-2-Amino-2-(1,4-cyclohexadien-1-yl)acetamido]cephalosporanic acid a. 33 mg. (2 mmol.) of chloromethylbenzoate are added to a mixture of 35 mg. (1 mmol.) of the product of Example 1 c and 15 ml. of dimethylformamide. The whole is stirred under an argon atmosphere for 24 hours. 150 ml. of ethyl acetate are added and the whole is filtered. The filtrate is washed with three portions of 5 percent aqueous sodium bicarbonate solution and with water until the water is at pH 7. The product is then dried over sodium sulfate and concentrated at reduced pressure. The residual product, the benzoyloxymethyl ester of 7-D-[2-amino-2-(1,4-cyclohexadien-1-yl)acetamido]cephalosporanic acid, is scrubbed with hexane and dried.

b. Benzoyloxymethyl ester of 7-[D-2-ureido-2-(1,4-cyclohexadien-1-yl)acetamido]cephalosporanic acid The product of part *a* is treated as in Example 1 *d* to obtain the above named product.

EXAMPLE 14

Benzoyloxymethyl ester of 7-[D-2-ureido-2-(1,4-cyclohexadien-1-yl)acetamido]-3-desacetoxycephalosporanic acid By utilizing 7-[D-2-amino-2-(1,4-cyclohexadien-1-yl)-acetamido]-3-desacetoxycephalosporanic acid as in Example 13, the benzoyloxymethyl ester of 7-[D-2-ureido-2-(1,4-cyclohexa-dien-1-yl)acetamido]-3-desacetoxycephalosporanic acid is obtained.

EXAMPLE 15 a. D-2-Amino-3-(1,4-cyclohexadien-1-yl)propionic acid 12.0 g. of D-phenylalanine are substituted for the D-phenylglycine in the procedure of Example 1 *a* to obtain D-2-amino-3-(1,4-cyclohexadien-1-yl)propionic acid as a white powder.

b. Methyl acetoacetate ester enamine of D-2-amino-3-(1,4-cyclohexadienyl)propionic acid sodium salt This product is obtained by substituting 330 mg. of the product of part *a* above in the procedure of Example 1 *b*.

c. 7-[D-2-amino-3-(1,4-cyclohexadien-1-yl)propionamido]-cephalosporanic acid 493 mg. of methyl acetoacetate enamine of D-2-amino-3-(1,4-cyclohexadienyl)propionic acid sodium salt (1.715 mmol.) are substituted for the methyl acetoacetate enamine of D-2-amino-2-(1,4-cyclohexadien-1-yl)acetic acid sodium salt in the procedure of Example 1 *c*.

The mixed anhydride is added to the 7–ACA, stirred for 30 minutes at −10° C., brought to room temperature, acidified to pH 2.0 as in part *c*. The solution is then extracted with 5 ml. of xylene. The aqueous layer is layered with 5 ml. of methyl isobutyl ketone and the pH is adjusted to 5.0 with 1 N NaOH. The aqueous layer is then lyophilized to give 7-[D-2-amino-3-(1,4-cyclohexadien-1-yl)propionamido]cephalosporanic acid.

d. 7-[D-2-ureido-3-(1,4-cyclohexadien-1(-yl)propionido]cephalosporanic acid

By utilizing the product of part *c* above in the procedure of Example 1 *d*, the pivaloyloxymethyl ester of 7-[D-2(-amino-3-(1,4-cyclohexadien-1-yl)propionamido]-cephalo-sporanic acid is obtained.

e. Pivaloyloxymethyl ester of 7-[D-2-ureido-3-(1,4-cyclohexadien-1-yl)propionamido]cephalosporanic acid By utilizing the product of part *c* above in the procedure of Example 1 *e*, the above named product is obtained.

EXAMPLE 16

Acetoxymethyl ester of 7-[D-2-ureido-2-(4-methoxy-1,4-cyclohexadien-1-yl)propionamido]cephalosporanic acid potassium salt By substituting 14.2 g. (72.7 mmol.) of D-0-methyltyrosine for the phenylglycine in the procedure of Example 1 *a*, D-2-amino-3-(4-methoxy-1,4-cyclohexadienyl)propionic acid is obtained as a white crystalline product, m.p. 227° C.

Then by using this compound in the procedure of Example 1, parts *b*, *c* and *d*, and by substituting 1.1 gm. of chloromethyl-acetate for the chloromethyl pivalate in part *e*, the above named product is obtained.

EXAMPLE 17

Pivaloyloxymethyl ester of 7-[D-2-ureido-3-(1,4-cyclohexadien-1-yl)propionamido]-3-desacetoxycephalosporanic acid By utilizing the procedure of Example 15, but substituting 356 mg. of 3-desacetoxy-7-aminocephalosporanic acid for the 7–ACA, the above product is obtained.

EXAMPLE 18

Pivaloyloxymethyl ester of 7-[DL-2-ureido-2-(4-methyl-1,4-cyclohexadien-1-yl)acetamido]cephalosporanic acid By substituting DL-4-methylphenylglycine for the phenyl-glycine in part *a* and otherwise following the procedure of Example 1, the above product is obtained.

EXAMPLE 19

Pivaloyloxymethyl ester of 7-[DL-2-ureido-2-(4-methyl-1,4-cyclohexadien-1-yl)-3-desacetoxycephalosporanic acid By substituting DL-4-methylphenylglycine for the phenyl-glycine in part *a* and substituting 7–ADCA for 7–ACA in part *c*, then otherwise following the procedure of Example 1, the above product is obtained.

EXAMPLE 20

Phenylacetoxymethyl ester of 7-[DL-2-ureido-2-(4-methoxy-1,4-cyclohexadien-1-yl)acetamido]cephalosporanic acid By utilizing phenylacetoxymethyl chloride in part *e* and DL-(4-methoxy)phenylglycine in part *a* of Example 1, the above named compound is obtained.

EXAMPLE 21

A sterile powder for reconstitution for use intramuscularly is prepared from the following ingredients which supply 1,000 vials each containing 250 mg. of active ingredient:

| | | |
|---|---|---|
| 7-[D-2-ureido(1,4-cyclohexadien-1-yl)acetamido]cephalosporanic acid pivaloyloxymethyl ester, sterile | 250 | mg. |
| Lecithin powder, sterile | 50 | gm. |
| Sodium carboxymethylcellulose, sterile | 20 | gm. |

The sterile powders are aseptically blended, subdivided, filled into sterile vials and sealed. The addition of 1 ml. of water for injection to the vial provides a suspension for intramuscular injection.

EXAMPLE 22

The following ingredients are admixed:

| | | |
|---|---|---|
| 7-[D-2-ureido-2-(1,4-cyclohexadien-1-yl)acetamido]cephalosporanic acid pivaloyloxymethyl ester | 250 | gm. |
| Lactose | 56.9 | gm. |
| Magnesium stearate | 3.1 | gm. |

The mixed ingredients are subdivided and filled into 1,000 number 2 gelatin capsules each containing a total of 310 mg. with 250 mg. of active substance.

EXAMPLE 23

Tablets are prepared from the following ingredients:

| | | |
|---|---|---|
| 7-[D-2-ureido-(1,4-cyclohexadien-1-yl)acetamido]cephalosporanic acid pivaloyloxymethyl ester | 5 | kg. |
| Polyvinyl pyrrolidone | 360 | gm. |
| Lactose | 780 | g. |
| Talc | 80 | gm. |
| Magnesium stearate | 80 | gm. |

The active substance is mixed with the lactose and granulated with an ethanol solution of the polyvinyl pyrrolidone. The wet material is screened, then dried at 45°. The dried material is screened and admixed with the talc and magnesium stearate. The mixture is compressed in a tabletting machine to obtain 10,000 tablets each weighing a total of 630 mg. and containing 500 mg. of active ingredient.

What is claimed is:

1. A compound of the formula

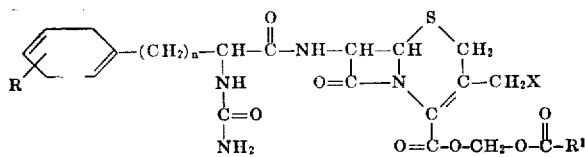

wherein R is hydrogen, lower alkyl or lower alkoxy, $R^1$ is lower alkyl, phenyl or phenyl-lower alkyl, X is hydrogen, hydroxy, lower alkanoyloxy, benzoyloxy or phenyl-lower alkanoyloxy, and $n$ is 0 or 1.

2. A compound as in claim 1 wherein R and X each is hydrogen and n is 0.

3. A compound as in claim 1 wherein $R^1$ is t-butyl.

4. A compound as in claim 2 wherein $R^1$ is t-butyl.

5. A compound as in claim 1 wherein R is hydrogen, X is lower alkanoyloxy and n is 0.

6. A compound as in claim 5 wherein $R^1$ is t-butyl.

7. A compound as in claim 5 wherein the lower alkanoyloxy group is acetoxy and $R^1$ is t-butyl.

* * * * *